(12) United States Patent
Chimbuya et al.

(10) Patent No.: US 11,432,679 B2
(45) Date of Patent: Sep. 6, 2022

(54) COOKING POT WITH LID THAT FACILITATES DYNAMIC VENTING

(71) Applicant: Canadian Tire Corporation, Limited, Toronto (CA)

(72) Inventors: Anthony Chimbuya, Toronto (CA); Bruce Cooper, Toronto (CA); David Quan, Toronto (CA); Anthony Wolf, Toronto (CA); Helen Kerr, Toronto (CA); Chay Young Lee, Toronto (CA); Brett Belcher, Thunder Bay (CA)

(73) Assignee: CANADIAN TIRE CORPORATION, LIMITED, Toronto (CA)

( * ) Notice: Subject to any disclaimer, the term of this patent is extended or adjusted under 35 U.S.C. 154(b) by 401 days.

(21) Appl. No.: 16/803,882

(22) Filed: Feb. 27, 2020

(65) Prior Publication Data

US 2020/0275799 A1 Sep. 3, 2020

(30) Foreign Application Priority Data

Feb. 28, 2019 (CA) .................................. CA 3035184

(51) Int. Cl.
*A47J 36/06* (2006.01)
*A23L 5/10* (2016.01)
*A47J 36/38* (2006.01)

(52) U.S. Cl.
CPC ................ *A47J 36/06* (2013.01); *A23L 5/10* (2016.08); *A47J 36/38* (2013.01); *A23V 2002/00* (2013.01)

(58) Field of Classification Search
CPC .. A47J 36/12; A47J 36/06; A47J 36/38; A47J 27/00; A47J 27/002; A23L 5/10; A23L 5/13; B65D 25/28; B65D 25/2802; B65D 39/16
USPC ......... 220/573.3, 573.1, 912, 755, 771, 769, 220/212.5, 212, 319, 315, 366.1, 203.19; 99/340
See application file for complete search history.

(56) References Cited

U.S. PATENT DOCUMENTS 4,865,219 A * 9/1989 Logan .................... A47G 19/08
206/557
5,992,308 A * 11/1999 Kroscher .............. A47J 27/002
D7/354

FOREIGN PATENT DOCUMENTS

AU       2011268502 A1 *  1/2013  ............ A47J 27/002

* cited by examiner

*Primary Examiner* — Robert J Hicks
(74) *Attorney, Agent, or Firm* — Alston & Bird LLP

(57) ABSTRACT

Described herein is a cooking pot comprising (a) a food vessel that has an opening in the shape of an oval or a polygon with more than two sides, and (b) a lid sized and shaped to substantially cover the opening of the food vessel. According to some embodiments of the present disclosure, the lid has a ring protruding from the bottom face, concentric about a vertical axis of the vessel. When the lid is rotated about the vertical axis at an angle from a closed position, the protruding ring is positioned adjacent to an interior edge of the vessel, corners or vertices of the opening are uncovered, and corresponding corners or vertices of the lid hang over the vessel exterior.

20 Claims, 10 Drawing Sheets

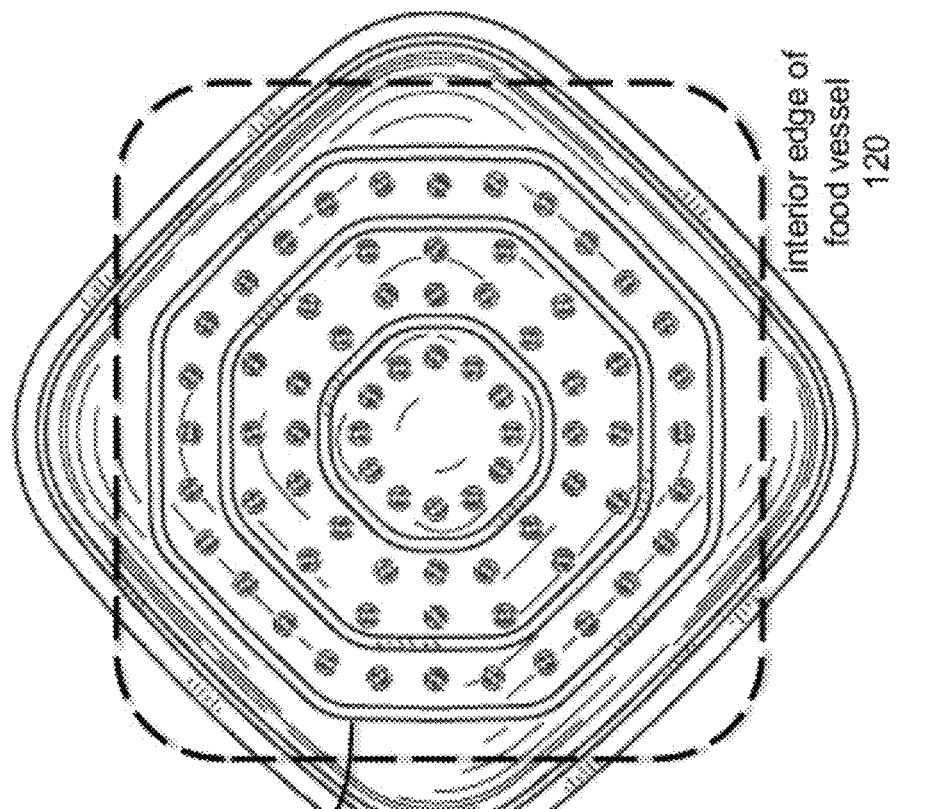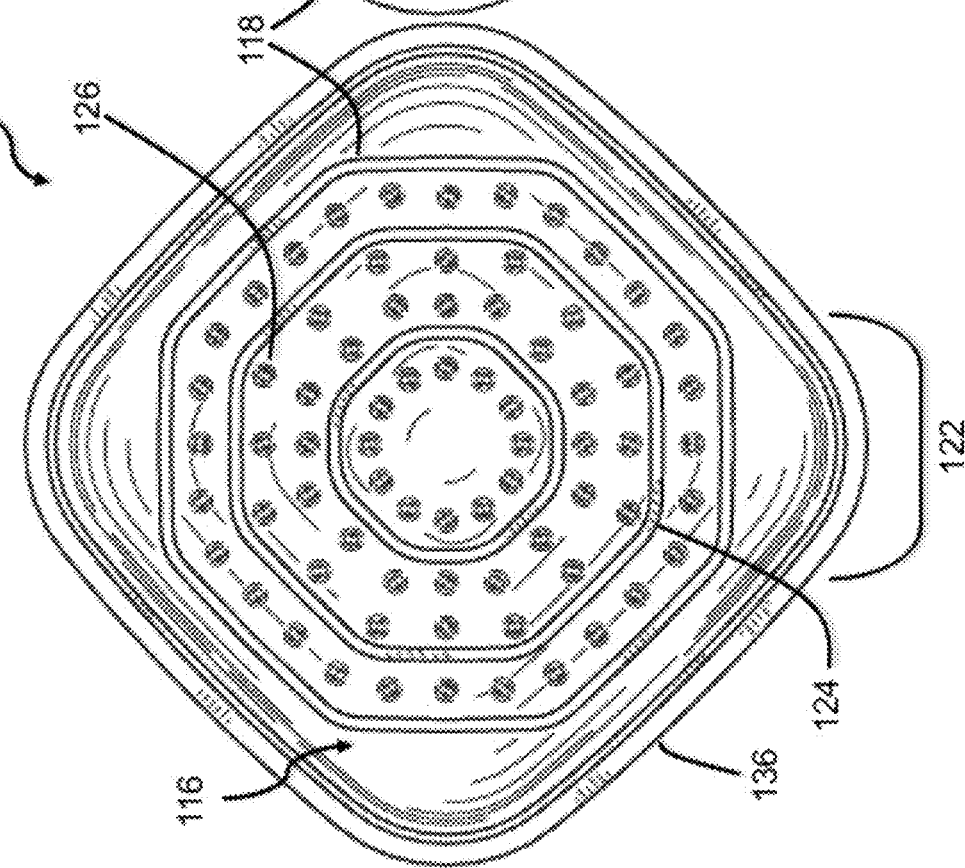

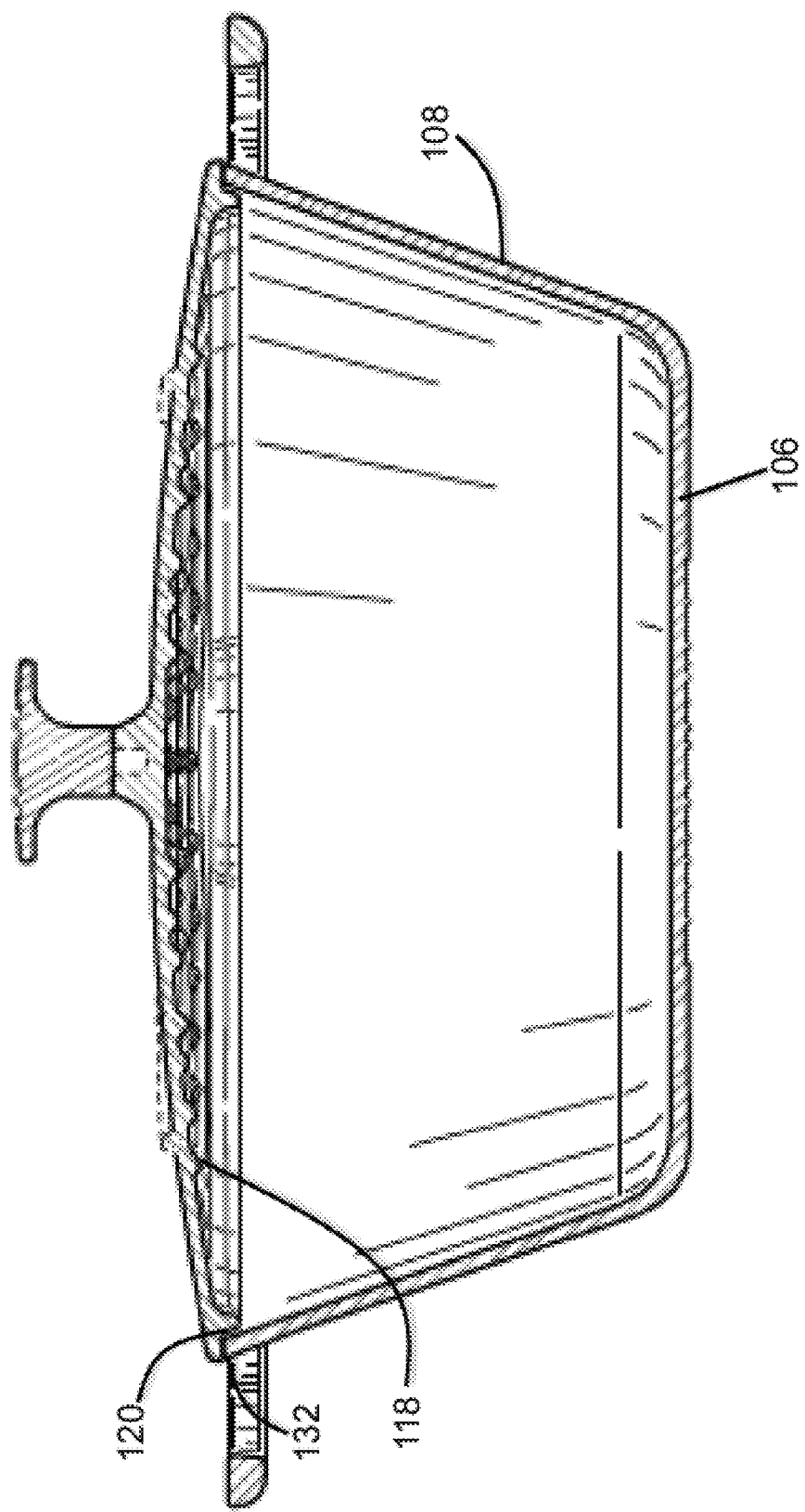

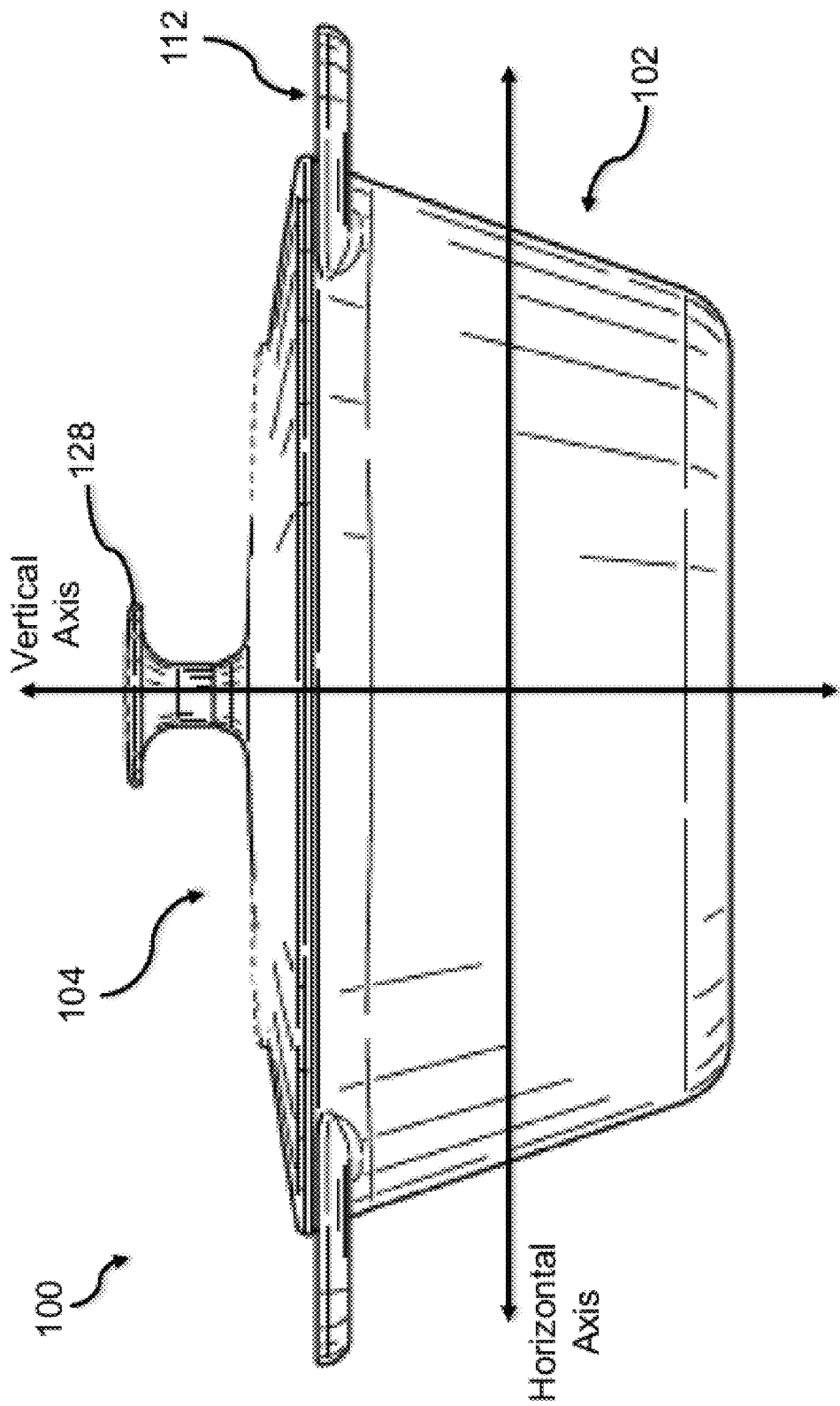

COOKING POT WITH LID THAT FACILITATES DYNAMIC VENTING

CROSS-REFERENCE TO RELATED APPLICATIONS

This application claims priority to and the benefit of Canadian Patent Application No. 3,035,184, as filed on Feb. 28, 2019; the contents of which as are hereby incorporated by reference herein in their entirety.

BACKGROUND

Related Field

The specification relates generally to food preparation apparatuses, and specifically to cooking pots for use on a stovetop or other cooking surfaces.

Related Art

Cooking pots are one type of cookware commonly found in a kitchen. The cooking pot is made of heat conductive material to transfer heat from a bottom surface to an interior cooking surface when the bottom surface of the cooking pot is placed on top of a heat source, such as a gas heater and electric heater. The cooking pot is typically cylindrical with a round bottom surface for optimal contact with a round cooktop burner.

Often in cooking, one is faced with the choice of leaving a pot open, covering the pot with a lid, or partially covering the pot with the lid precariously balanced on the rim. Leaving the pot uncovered would increase the loss of liquid ingredients or moisture due to evaporation and increase the length of cooking time due to a loss of thermal energy. Having the pot fully covered with a lid would prevent evaporation of liquids and preserve the steam or heat to allow the food to cook faster. However, this option has major drawbacks, such as a high risk of boiling over, which results in creating a mess on the cooktop and losing a portion of the food. Partially covering the pot with a lid precariously balanced on the rim would reduce evaporation and lower the chance of boiling over. However, there are some disadvantages of this approach, including: (1) the lid can be easily knocked over and result in a mess on the cooktop or damaged cooktop especially in case of glass cooktops, and (2) the condensation formed on the lid can drip onto the cooktop via the overhang portion of the lid that extend beyond the edge of the pot.

Based on the foregoing, there is a need in the art for a cooking pot that allows venting during cooking without unnecessary mess and heat or moisture loss.

BRIEF SUMMARY

The needs remaining in the prior art are addressed by the present disclosure, which relates to an improved cooking pot; more particularly, to a cooking pot comprised of a food vessel and a lid arrangement that permits dynamic venting during food preparation without, according to at least some embodiments, excessive loss of heat or moisture that would result from leaving the pot uncovered or unnecessary mess or damage to the cooktop that would result from fully covering the pot or partially covering the pot with the lid balanced on the rim.

In accordance with the present disclosure, a cooking pot for preparing foods is comprised of a food vessel and a lid. The food vessel has a base and a wall extending upwardly from and about a perimeter of the base; the wall forms an opening in the shape of an oval or a polygon with more than two sides. The lid is generally in the same oval or polygon shape as the opening of the vessel and is sized to substantially cover the opening when the lid is disposed in a first position relative to the opening. The shape of the opening and the lid allows a user to rotate the lid about the vertical axis of the vessel to a second position, wherein corners or vertices of the opening are uncovered and corresponding corners or vertices of the lid hang over an exterior edge of the vessel. Such an arrangement usually permits at least some dynamic venting during food preparation without excessive loss of heat or moisture and helps avoid the risk of creating a mess or damaging the cooktop if a lid of a conventional cooking pot falls off while partially covering the pot by balancing on the rim.

The lid also has a ring protruding from the lid's bottom face concentric about a vertical axis of the vessel and the ring is positioned adjacent to an interior edge of the vessel when the lid is disposed in the second position. This feature generally acts as a barrier to help direct condensed liquid formed on the bottom face of the lid to drip downwards within the wall of the vessel, allowing condensed liquid to fall back into the food vessel, as opposed to the cooktop, to avoid an excessive loss of moisture and drippings of condensed liquid on the cooktop.

In accordance with one embodiment of the present disclosure, a cooking pot is comprised of a food vessel with a circular base and a square shaped opening and lid. The circular base usually allows optimal contact with a circular burner during food preparation. Rotating the square shaped lid about 45 degrees from the first position to the second position on the square shaped opening of the vessel exposes four corners of the vessel, allowing for at least some steam or air to escape (vent). The lid further comprises a plurality of additional concentric rings and dots protruding from the bottom face of the lid. The plurality of dots are located within a protruded ring that is positioned adjacent to the interior edge of the vessel when the lid is disposed in the second position. The arrangement of the protruded rings and dots facilitates the collecting and directing of vapour steam contacting and condensing on the bottom face of the lid to fall back into the vessel.

Other and further aspects and features of the present disclosure will become apparent during the course of the following discussion and by reference to the accompanying drawings.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 7A depicts a bottom plan view of a lid for the cooking pot of FIG. 1, according to a non-limiting embodiment of the present disclosure;

FIG. 7B depicts a schematic of the bottom plan view of the lid of FIG. 7A, according to a non-limiting embodiment of the present disclosure, and the lid's relative position with an interior edge of the food vessel;

FIG. 8 depicts a cross-section view of the cooking pot of FIG. 1, according to a non-limiting embodiment of the present disclosure;

FIG. 10 depicts a front view of the cooking pot of FIG. 1, according to a non-limiting embodiment of the present disclosure, wherein the lid is disposed in the first position.

DETAILED DESCRIPTION

Figure 1:
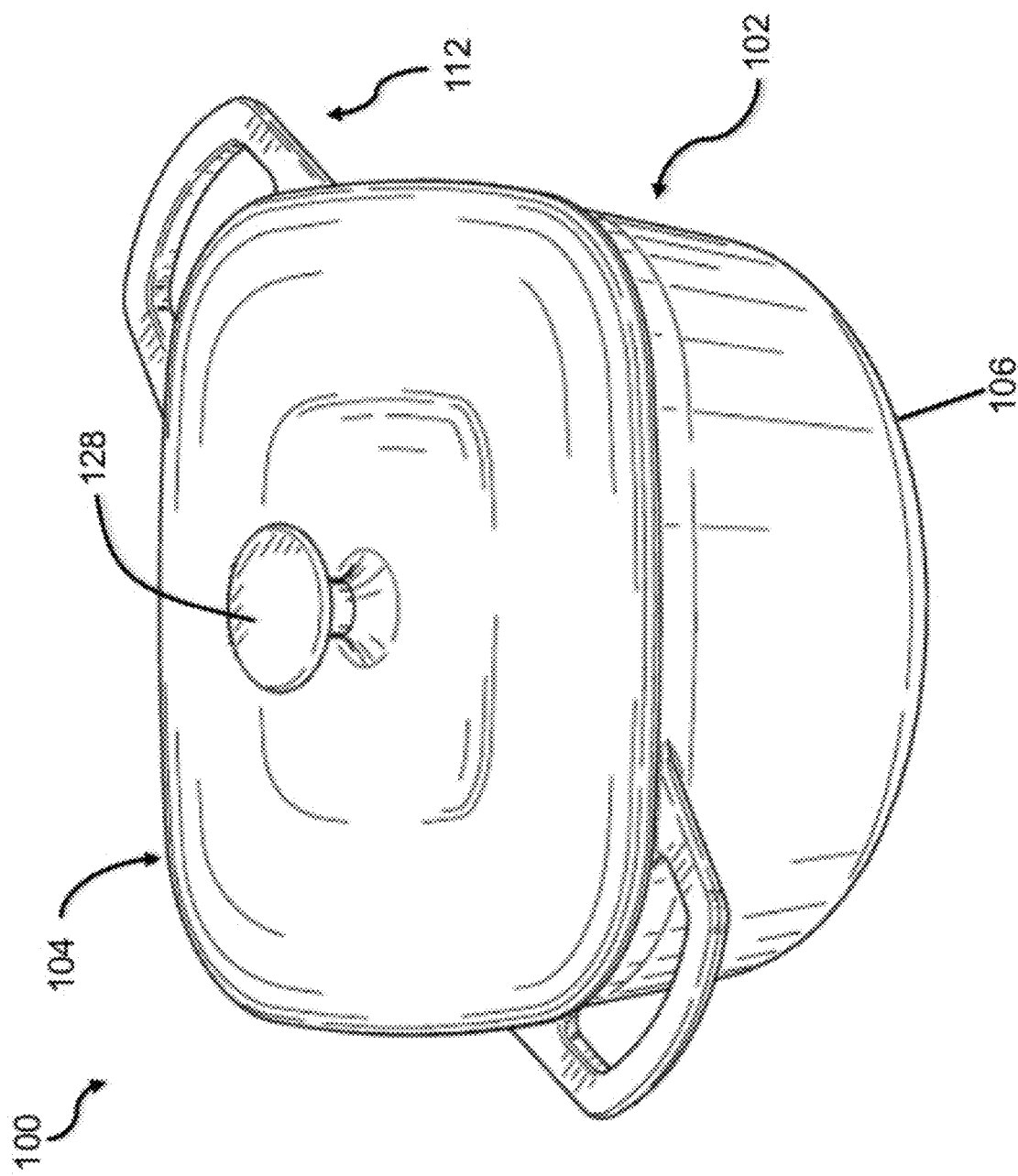
FIG. 1 depicts a perspective view of a cooking pot according to a non-limiting embodiment of the present disclosure, wherein the lid is disposed in the first position.

The food preparation apparatus of the present disclosure may, according to at least some embodiments, prevent the unnecessary mess and heat or moisture loss during cooking associated with leaving a pot uncovered, fully covered, or partially covered by balancing a lid on the rim. As will be discussed in detail below, the described food preparation apparatus comprises a two-component cooking pot, having a food vessel and a lid, that is specifically configured to allow a portion of the steam to escape the pot through a particular arrangement of the food vessel and the lid without, according to at least some embodiments, unnecessary mess and heat or moisture loss during cooking.

According to some embodiments, the described apparatus may also result in utility cost savings since the food may cook faster, not to mention time savings by not having to worry about over-boiling, condensation drippings, and cleaning up the mess associated with them.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skilled in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Figure 2:
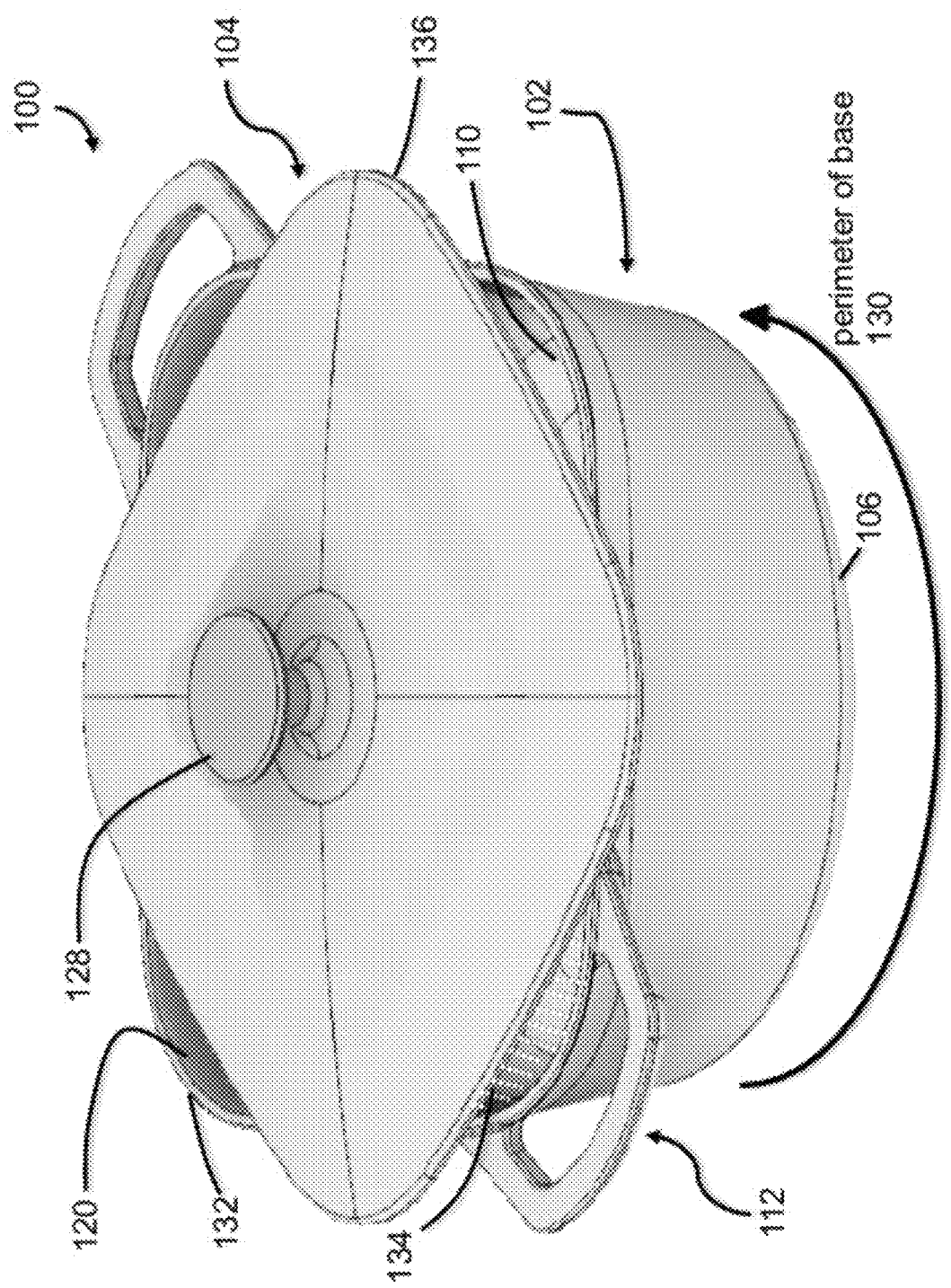
FIG. 2 depicts a perspective view of the cooking pot of FIG. 1, according to a non-limiting embodiment of the present disclosure, wherein the lid is disposed in the second position.
Figure 3:
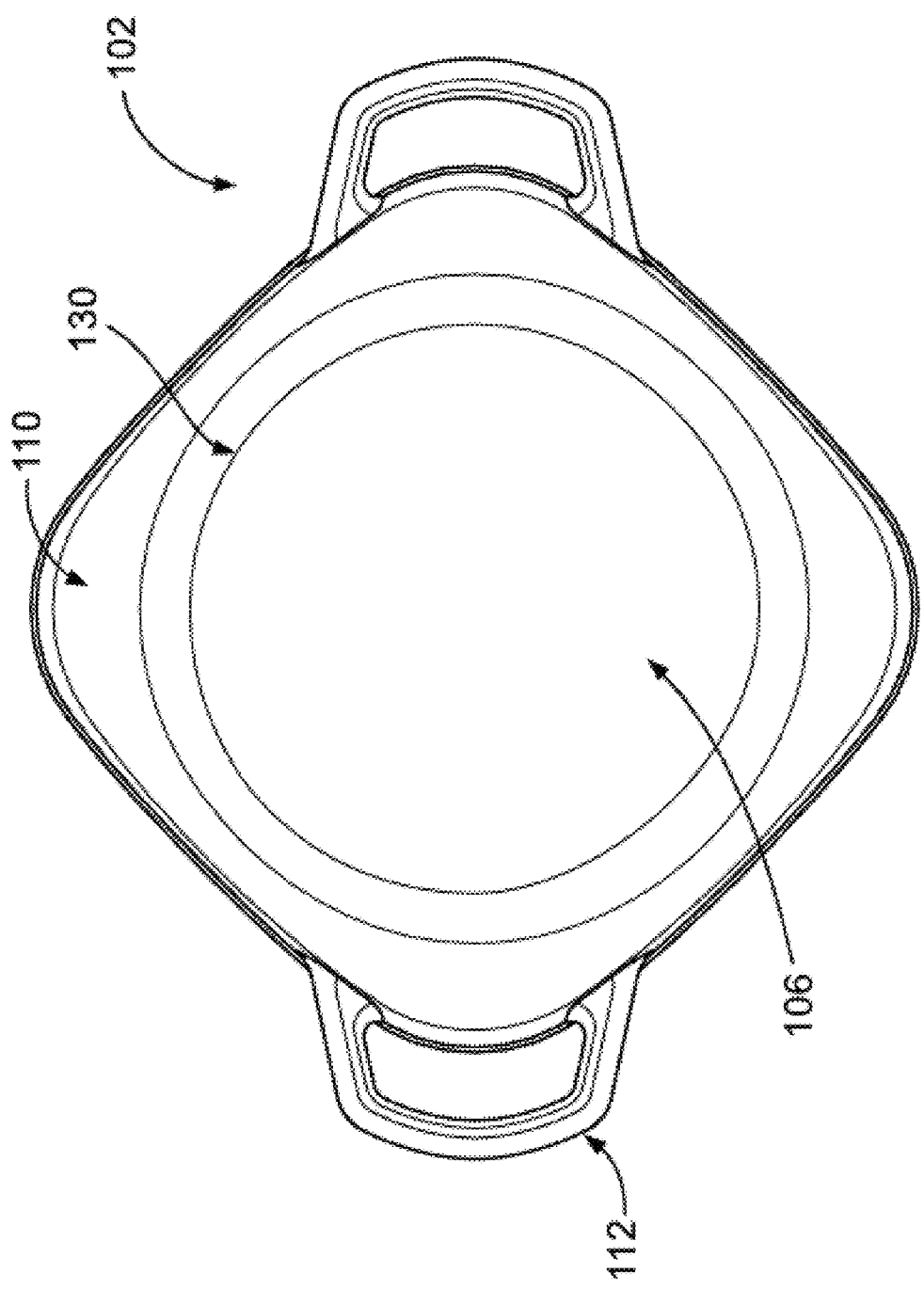
FIG. 3 depicts a top plan view of the food vessel of FIG. 1, according to a non-limiting embodiment of the present disclosure.
Figure 4:
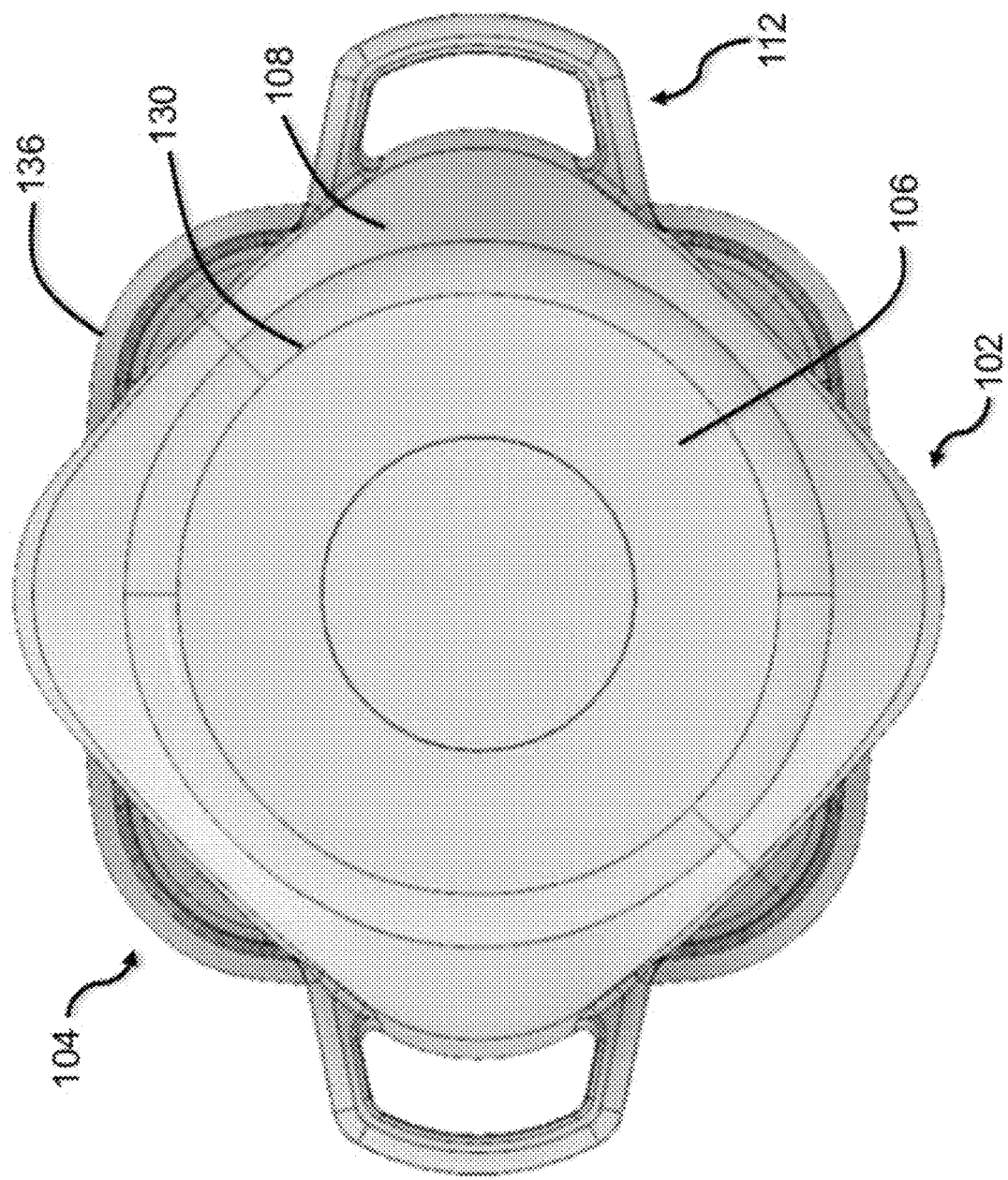
FIG. 4 depicts a bottom plan view of the cooking pot of FIG. 1, according to a non-limiting embodiment of the present disclosure, wherein the lid is disposed in the second position.

Attention is directed to FIGS. 1 and 2, which depict an example cooking pot 100, according to a non-limiting embodiment of the present disclosure. Cooking pot 100 comprises a food vessel 102 and a lid 104. Food vessel 102 comprises a base 106 and an upward extending wall 108 about a perimeter 130 of the base 106 (FIGS. 3, 4, 8 and 9), which forms an opening 110 in the shape of a polygon with more than two sides. While the description refers to a singular upward extending wall, it will be understood by those of ordinary skilled in the art that, according to some embodiments, the reference could be for a plurality of walls.

According to some embodiments, the vessel base 106 and the vessel opening 110 are different shapes. For example, according to the embodiment depicted in FIG. 1, the vessel base 106 is circular, which may to help optimize heat contact with a circular cooktop burner, and the vessel opening 110 is square shaped. However, any suitably shaped base and opening are contemplated. The wall 108 is shaped so as to transition between the shape of the vessel base 106 and the vessel opening 110. According to some embodiments, the food vessel 102 may comprise one or more handles 112 for ease of handling.

Figure 5:
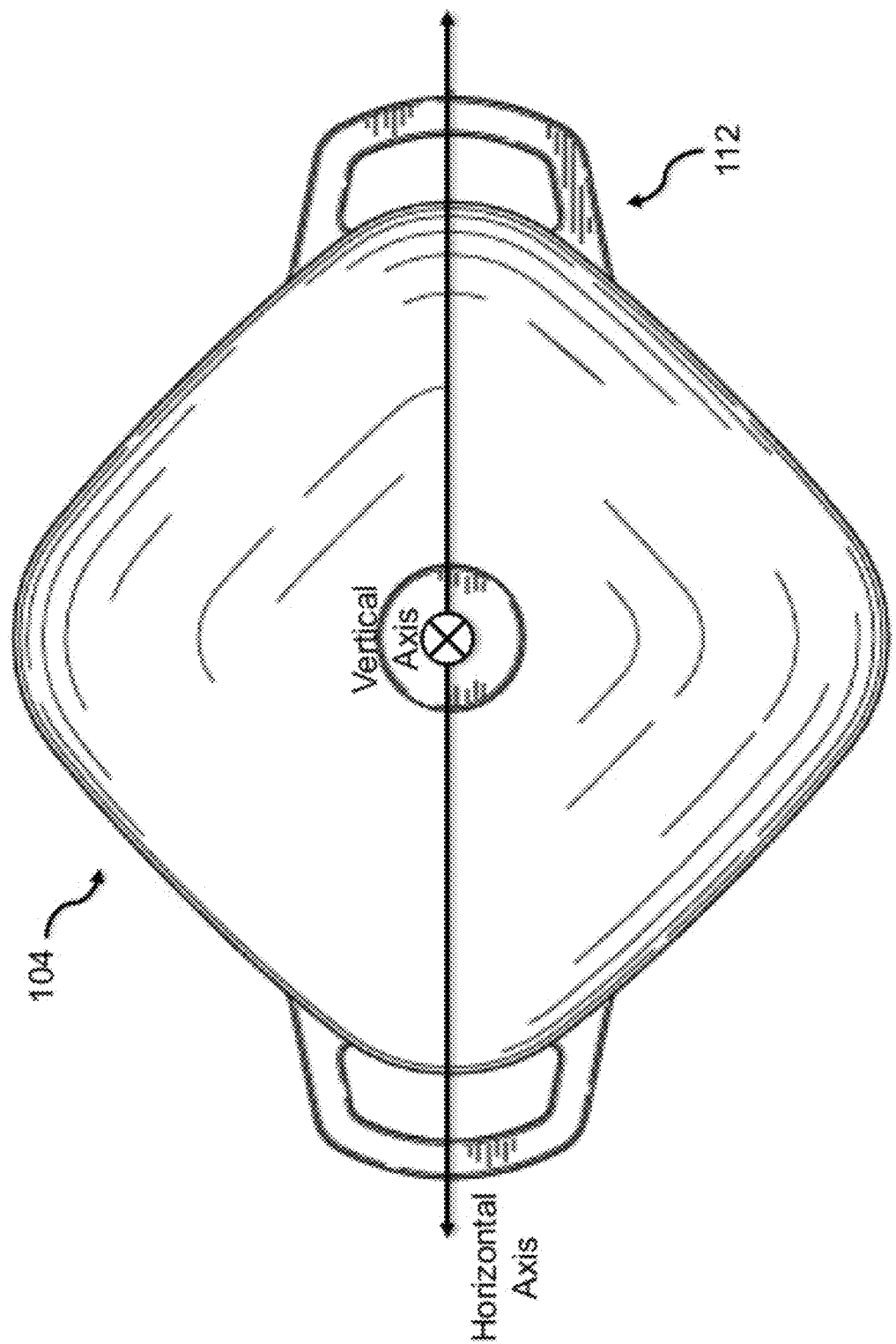
FIG. 5 depicts a top plan view of the cooking pot of FIG. 1, according to a non-limiting embodiment of the present disclosure, wherein the lid is disposed in the first position.

Lid 104 is shaped and sized to substantially cover the vessel opening 110 when the lid is disposed in a first position relative to the opening (FIG. 5). When lid 104 is disposed in a second position relative to the opening 110 (FIG. 6), the lid is rotated about the vertical axis of the vessel at an angle from the first position (FIG. 10) and corners 114 (also referred to herein as vertices) of food vessel 102 are uncovered to allow for dynamic venting through openings 134 between an exterior edge 136 of the lid 104 and the interior edge 120 of food vessel 102 during cooking. Corners of the lid 104 that may correspond to corners 114 of the food vessel 102 in the first position, such as corners 122, hang over an exterior edge 132 of the wall 108. The corners 114 may also provide a spout for pouring liquids or foods from the cooking pot 100 without the lid 104 or, if more controlled pouring is desired, with the lid 104 in the second position (via openings 134).

Figure 6:
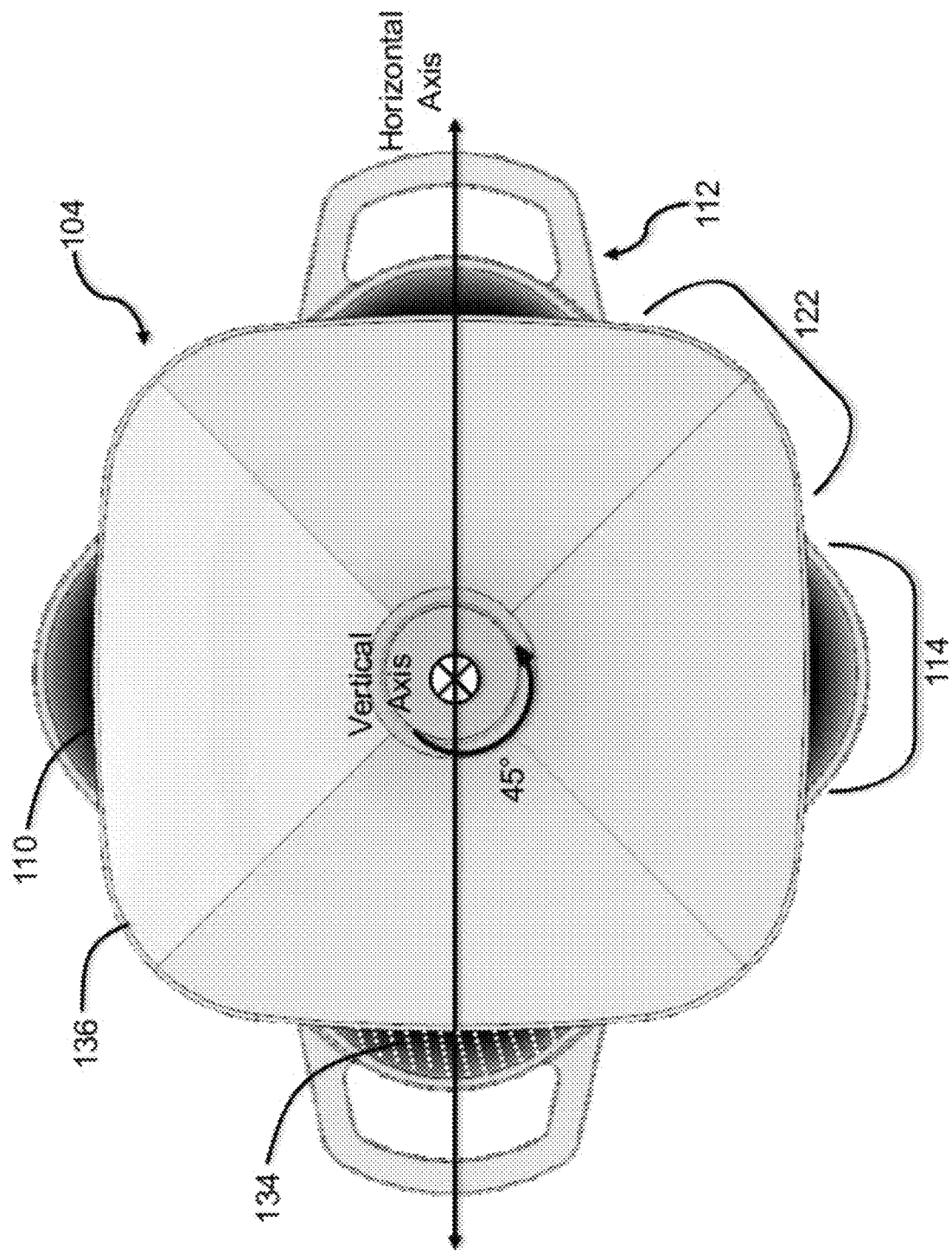
FIG. 6 depicts a top plan view of the cooking pot of FIG. 1, according to a non-limiting embodiment of the present disclosure, wherein the lid is disposed in the second position.
Figure 9:
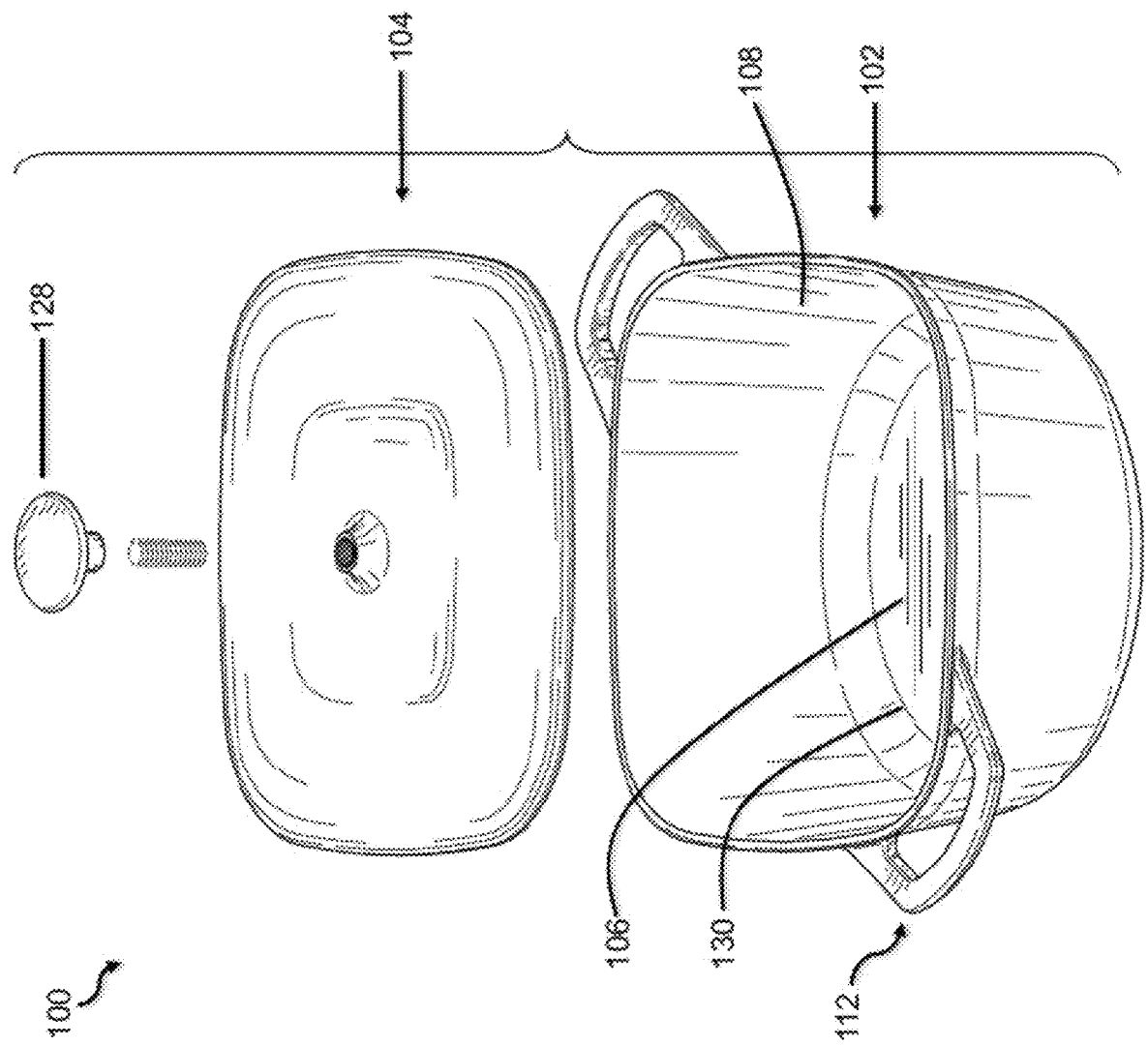
FIG. 9 depicts an exploded view of the cooking pot of FIG. 1, according to a non-limiting embodiment of the present disclosure, wherein the lid is disposed in the first position.

According to the embodiment depicted in FIG. 1, lid 104 is in the shape of a square and can be rotated about 45 degrees, for example, about the vertical axis to expose corners 114 of food vessel 102 (FIG. 6). The bottom face 116 of lid 104 comprises a protruded ring 118 that is positioned adjacent to the interior edge 120 of food vessel 102 when the lid 104 is disposed in the second position relative to the opening 110 (FIG. 7). For further clarification, attention is directed to FIG. 7B, which depicts a schematic that illustrates the position of the protruded ring 118 relative to the interior edge 120 of food vessel 102 when the lid 104 is in the second position relative to the opening 110. Protruded ring 118 usually acts as a barrier to condensed liquid formed on the bottom face 116 of lid 104 to help prevent condensation from travelling to overhanging corners 122 of lid 104 and dripping therefrom.

According to some embodiments, the bottom face 116 of lid 104 further comprises one or more additional protruded concentric rings 124 and a plurality of dots 126 (also referred to herein as protuberances or projections) within protruded ring 118 (see, for example, FIG. 7A). The protuberances or projections facilitate the directing of steam vapour that has condensed into liquid on the bottom face 116 into food vessel 102, which may also help keep food moist. According to some embodiments, lid 104 may comprise one or more handles 128 for ease of handling.

Persons skilled in the art will appreciate that there are yet more alternative implementations and modifications possible, and that the above examples are only illustrations of one or more implementations. The scope, therefore, is only to be limited by the claims appended hereto.

INTERPRETATION

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as being "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

What is claimed is:

1. A cooking pot comprising:
   (a) a food vessel having a base and a wall extending upwardly from and about a perimeter of the base, wherein said wall forms an opening in the shape of an oval or a polygon with more than two sides; and
   (b) a lid sized and shaped to substantially cover the opening of the food vessel of (a) when the lid is disposed in a first position relative to the opening, wherein
      a bottom face of said lid has a ring protruding therefrom concentric about a vertical axis of the vessel, and
      when the lid is disposed in a second position relative to the opening,
         the lid is rotated about the vertical axis at an angle from the first position,
         the ring is positioned adjacent to an interior edge of the opening,
         corners or vertices of the opening are uncovered, and
         corners or vertices of said lid hang over an exterior edge of the wall.

2. The cooking pot of claim 1, wherein the base of food vessel and the opening are of different shapes.

3. The cooking pot of claim 2 further comprising one or more additional rings protruding from the bottom face concentric about the vertical axis and within the ring of (b).

4. The cooking pot of claim 1, further comprising one or more additional rings protruding from the bottom face concentric about the vertical axis and within the ring of (b).

5. The cooking pot of any one of claim 1, further comprising a plurality of dots protruding from the bottom face within the protruded ring of (b).

6. The cooking pot of any one of claim 2, further comprising a plurality of dots protruding from the bottom face within the protruded ring of (b).

7. The cooking pot of any one of claim 4, further comprising a plurality of dots protruding from the bottom face within the protruded ring of (b).

8. The cooking pot of claim 1, wherein the lid and the opening are in the shape of a square.

9. The cooking pot of claim 2, wherein the lid and the opening are in the shape of a square.

10. The cooking pot of claim 4, wherein the lid and the opening are in the shape of a square.

11. The cooking pot of claim 1, wherein the base of the food vessel is circular.

12. The cooking pot of claim 2, wherein the base of the food vessel is circular.

13. The cooking pot of claim 4, wherein the base of the food vessel is circular.

14. The cooking pot of claim 8, wherein the base of the food vessel is circular.

15. The cooking pot of claim 1, wherein the angle of rotation of the lid between the first and second position is about 45 degrees.

16. The cooking pot of claim 2, wherein the angle of rotation of the lid between the first and second position is about 45 degrees.

17. The cooking pot of claim 4, wherein the angle of rotation of the lid between the first and second position is about 45 degrees.

18. The cooking pot of claim 8, wherein the angle of rotation of the lid between the first and second position is about 45 degrees.

19. The cooking pot of claim 11, wherein the angle of rotation of the lid between the first and second position is about 45 degrees.

20. Use of the cooking pot of claim 1 for the preparation of food by heat.

* * * * *